(12) United States Patent
Liao

(10) Patent No.: US 9,163,665 B2
(45) Date of Patent: Oct. 20, 2015

(54) LINEAR GUIDEWAY

(71) Applicant: OME TECHNOLOGY CO., LTD., New Taipei (TW)

(72) Inventor: Wen-Pin Liao, New Taipei (TW)

(73) Assignee: OME Technology Co., Ltd., New Taipei (TW)

( * ) Notice: Subject to any disclaimer, the term of this patent is extended or adjusted under 35 U.S.C. 154(b) by 82 days.

(21) Appl. No.: 14/039,097

(22) Filed: Sep. 27, 2013

(65) Prior Publication Data

US 2015/0093056 A1  Apr. 2, 2015

(51) Int. Cl.
*F16C 29/06* (2006.01)
*F16C 29/08* (2006.01)

(52) U.S. Cl.
CPC ........... *F16C 29/086* (2013.01); *F16C 29/0609* (2013.01); *F16C 29/0647* (2013.01)

(58) Field of Classification Search
CPC ............... Y10T 29/49641; F16C 29/06; F16C 29/0607; F16C 29/0609; F16C 29/0642; F16C 29/0652; F16C 29/0659; F16C 33/3682
USPC ........................ 384/7, 15, 43–45, 49, 51, 55
See application file for complete search history.

(56) References Cited

U.S. PATENT DOCUMENTS

| 4,502,737 | A | * | 3/1985 | Osawa | 384/45 |
| 4,582,369 | A | * | 4/1986 | Itoh | 384/13 |
| 4,932,067 | A | * | 6/1990 | Pester et al. | 384/45 |
| 5,102,235 | A | * | 4/1992 | Mugglestone | 384/45 |
| 5,431,498 | A | * | 7/1995 | Lyon | 384/45 |
| 6,012,845 | A | * | 1/2000 | Lyon | 384/12 |
| 6,132,093 | A | * | 10/2000 | Michioka et al. | 384/45 |
| 6,729,760 | B2 | * | 5/2004 | Mochizuki et al. | 384/45 |
| 7,717,622 | B2 | * | 5/2010 | Winkler | 384/45 |
| 7,832,930 | B2 | * | 11/2010 | Geka et al. | 384/51 |
| 8,506,166 | B2 | * | 8/2013 | Yoshida | 384/44 |
| 2005/0213855 | A1 | * | 9/2005 | Shing-Neng et al. | 384/44 |

FOREIGN PATENT DOCUMENTS

JP   2007016800 A * 1/2007
JP   2010156381 A * 7/2010

* cited by examiner

*Primary Examiner* — Marcus Charles
(74) *Attorney, Agent, or Firm* — Rosenberg, Klein & Lee

(57) ABSTRACT

A retainer of the linear guideway comprises a retaining member a supporting member. The retaining member has a base portion and two side wing portions integrally extended from the base portion. The base portion has a receiving groove, and each side wing portion has a positioning opening. One positioning opening is offset with respect to the receiving groove along a first direction, and another positioning opening is offset with respect to the receiving groove along a second direction opposite to the first direction. One side portion of the supporting member is wedged to the receiving groove of the base portion. Thus, the instant disclosure provides the retainer for positioning two staggered circulation tubes. Moreover, the instant disclosure also provides a linear guideway.

6 Claims, 14 Drawing Sheets

LINEAR GUIDEWAY

BACKGROUND OF THE INVENTION

1. Field of the Invention

The instant disclosure relates to a guide rail; more particularly, to a linear guideway.

2. Description of Related Art

The linear guideway includes a guide rail, a sliding block slidably sleeved at the guide rail and having a rolled surface, a rolling unit in chain type or non-chain type arranged between the guide rail and the sliding block, a circulation module for providing the rolling unit to roll therein, and two end caps respectively fixed on two opposite ends of the sliding block. Specifically, the rolling unit needs to maintain the relative position with respect to the sliding block by a retainer. Thus, the construction of retainer is an important developing direction for effectively positioning the rolling unit and improving the stability of the linear guideway.

To achieve the abovementioned improvement, the inventors strive via industrial experience and academic research to present the instant disclosure, which can provide additional improvement as mentioned above.

SUMMARY OF THE INVENTION

One embodiment of the instant disclosure provides a linear guideway and a retainer thereof for effectively positioning two circulation tubes simultaneously by the structural design of each retainer.

The linear guideway, comprises: a guide rail having two opposite rolled grooves; a sliding block having a mating trough slidably sleeved at the guide rail, the sliding block having four accommodating channels respectively penetrating two opposite portions thereof and respectively arranged at two opposite sides of the mating trough; two circulation modules respectively fixed on the opposite portions of the sliding block, each circulation module comprising: two circulation tubes respectively coupling through two adjacent accommodating channels, each circulation tube partially protruding out of the sliding block; and two rolling units respectively arranged into the circulation tubes, wherein part of each rolling unit is arranged out of the corresponding circulation tube and clipped between the guide rail and the sliding block; and two retainers respectively arranged in the rolled grooves of the guide rail and installed on the sliding block, wherein the retainers are configured to position and keep the positions of the circulation modules with respect to the guide rail, each retainer comprising: a retaining member having a base portion and two side wing portions integrally extended from the base portion, each side wing portion has a positioning opening, wherein the circulation tubes of the corresponding circulation module are positioned at the retaining member by the circulation tubes respectively coupling through the positioning openings of the side wing portions, and part of each rolling unit arranged out of the corresponding circulation tube is arranged in the corresponding positioning opening; and a supporting member having two opposite side portions respectively wedged to the base portion of the retaining member and the sliding block; and two end cap modules fixed on the sliding block and slidably sleeved at the guide rail, and the end cap modules respectively covering the portions of the circulation modules protruding out of the sliding block.

The retainer of the linear guideway comprises: a retaining member having a base portion and two side wing portions integrally extended from the base portion, the base portion having a receiving groove, each side wing portion having a positioning opening, wherein one positioning opening is offset with respect to the receiving groove along a first direction, another positioning opening is offset with respect to the receiving groove along a second direction opposite to the first direction; and a supporting member having one side portion wedged to the receiving groove of the base portion.

In summary, the linear guideway of the instant disclosure enables the retainer to simultaneously positioning two circulation tubes by the positioning openings of the retaining member and the supporting member wedged between the retaining member and the sliding block.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
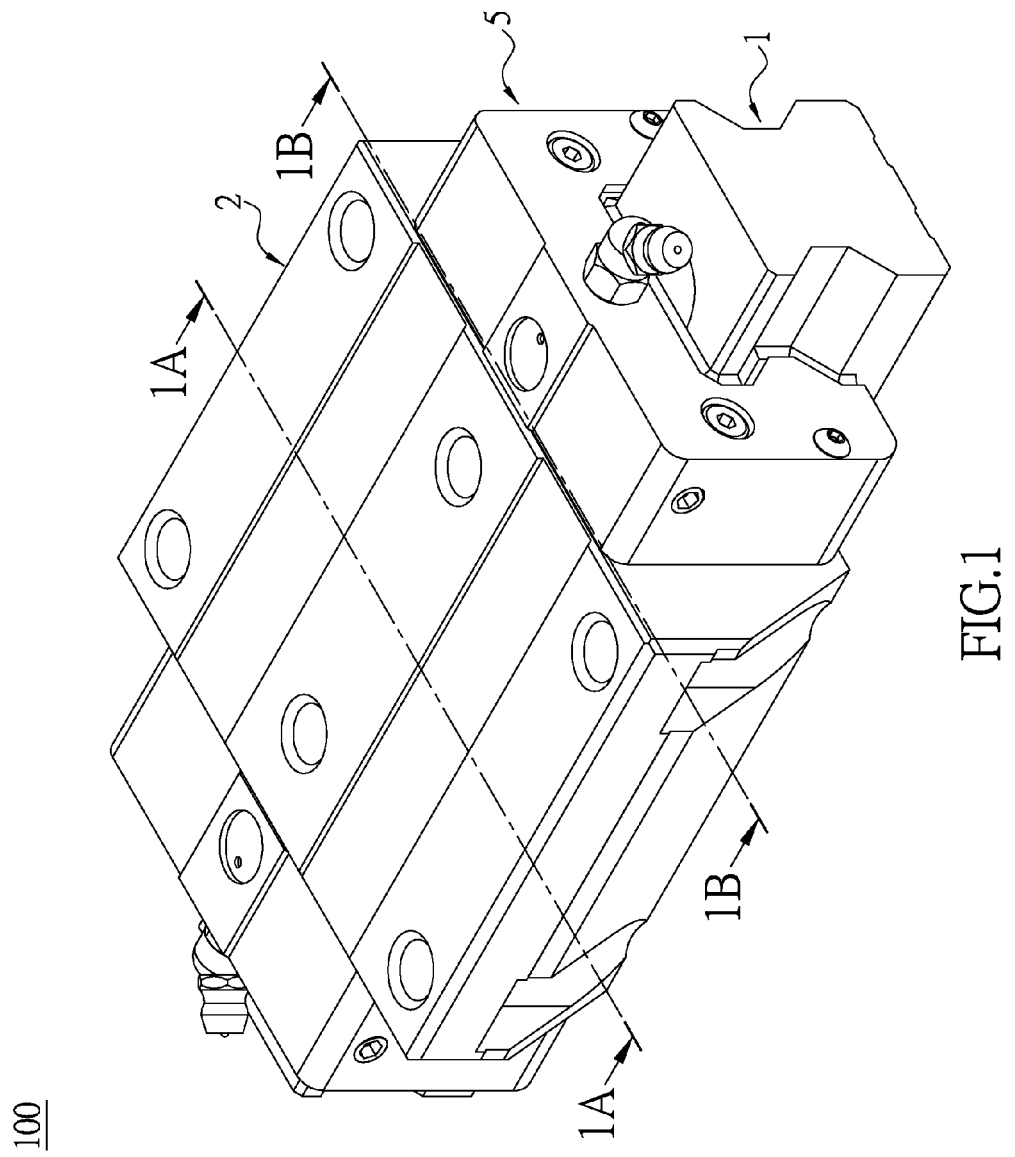
FIG. 1 is a perspective view illustrating a linear guideway according to the instant disclosure.
Figure 2:
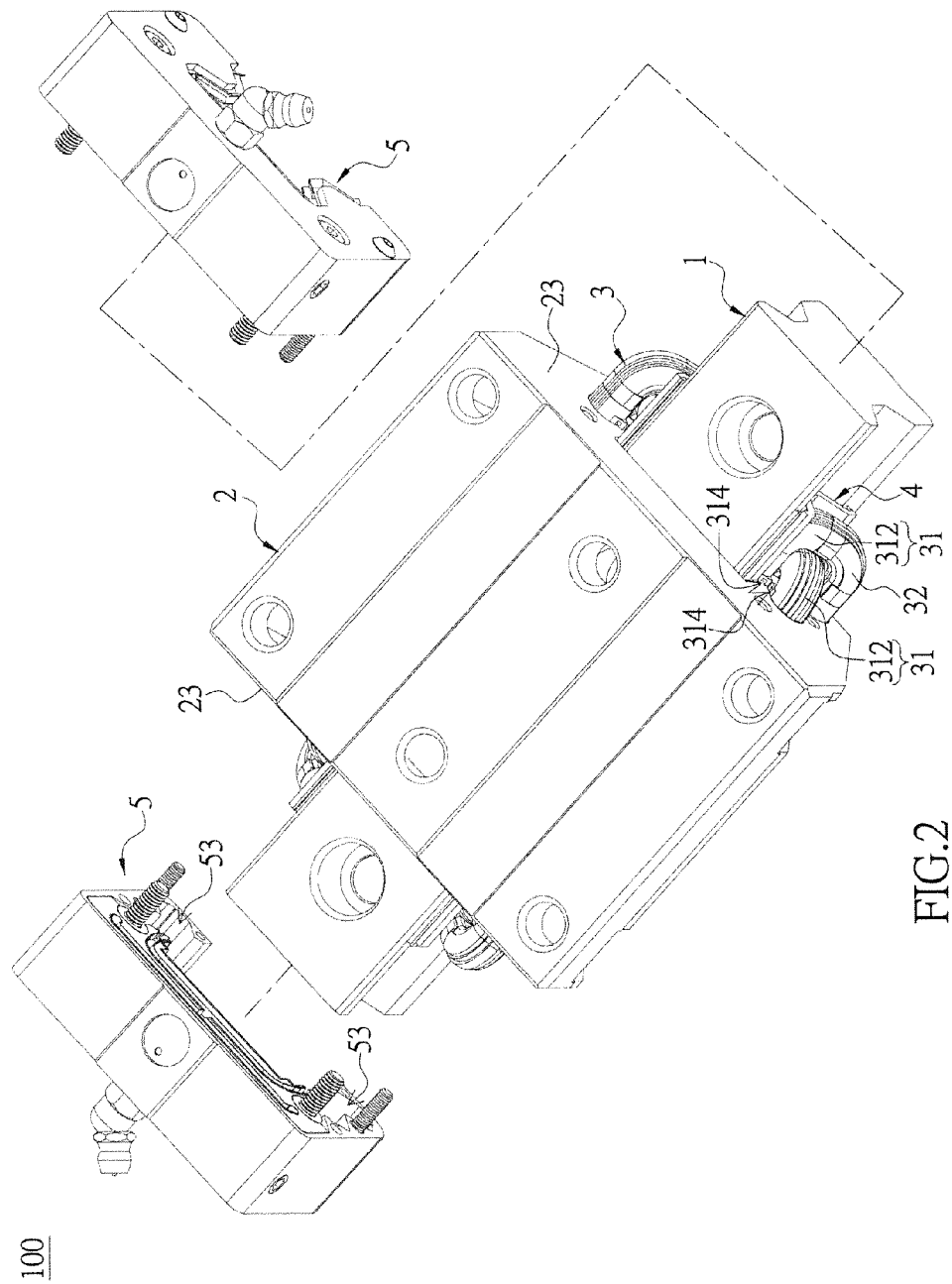
FIG. 2 is an exploded view of the linear guideway according to the instant disclosure.

Please refer to FIGS. 1 and 2, which show an embodiment of the instant disclosure. The embodiment provides a linear guideway 100 including a guide rail 1, a sliding block 2, two circulation modules 3, two retainers 4, and two end cap modules 5. The circulation modules 3 are coupled through the sliding block 2, the retainers 4 are respectively disposed on the circulation modules 3, and the end cap modules 5 are respectively fixed on two opposite end surfaces 23 of the sliding block 2 (i.e., the front surface and the rear surface of the sliding block 2 as shown in FIG. 2). Moreover, the sliding block 2, the circulation modules 3, the retainers 4, and the end cap modules 5 are slidably disposed on the guide rail 1 and symmetrical to the guide rail 1.

Figure 3:
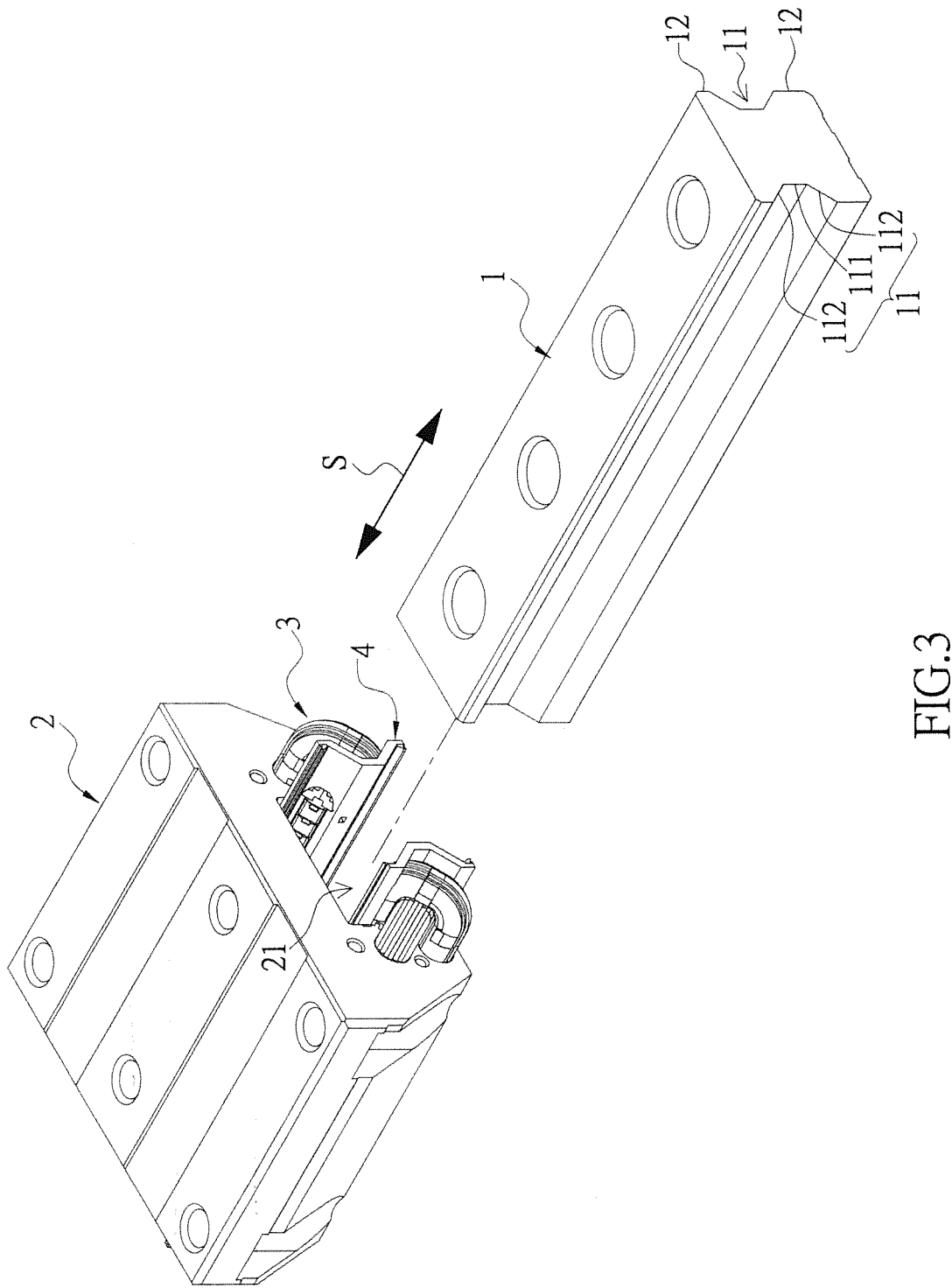
FIG. 3 is an exploded view illustrating the guide rail, the sliding block, the circulation modules, and the retainers according to the instant disclosure.

Please refer to FIG. 3. The guide rail 1 is an elongated structure, the axis of elongation of guide rail 1 defines a sliding direction S, and the cross-section of the guide rail 1, which is perpendicular to the sliding direction S, is approximately I-shaped. Specifically, the guide rail 1 includes two elongated rolled grooves 11 respectively formed on two opposite side surfaces thereof (i.e., the left side surface and the right side surface of the guide rail 1 as shown in FIG. 2), and each rolled groove 11 is parallel to the sliding direction S. The other portion of each side surface of the guide rail 1, which is connected to the edge of the rolled groove 11, is defined as a contact surface 12. Each rolled groove 11 has a bottom wall 111 and two loaded side wall 112 respectively connected to two opposite edges of the bottom wall 111 (i.e., the top edge and the bottom edge of the bottom wall 111 as shown in FIG. 2).

Figure 1A:
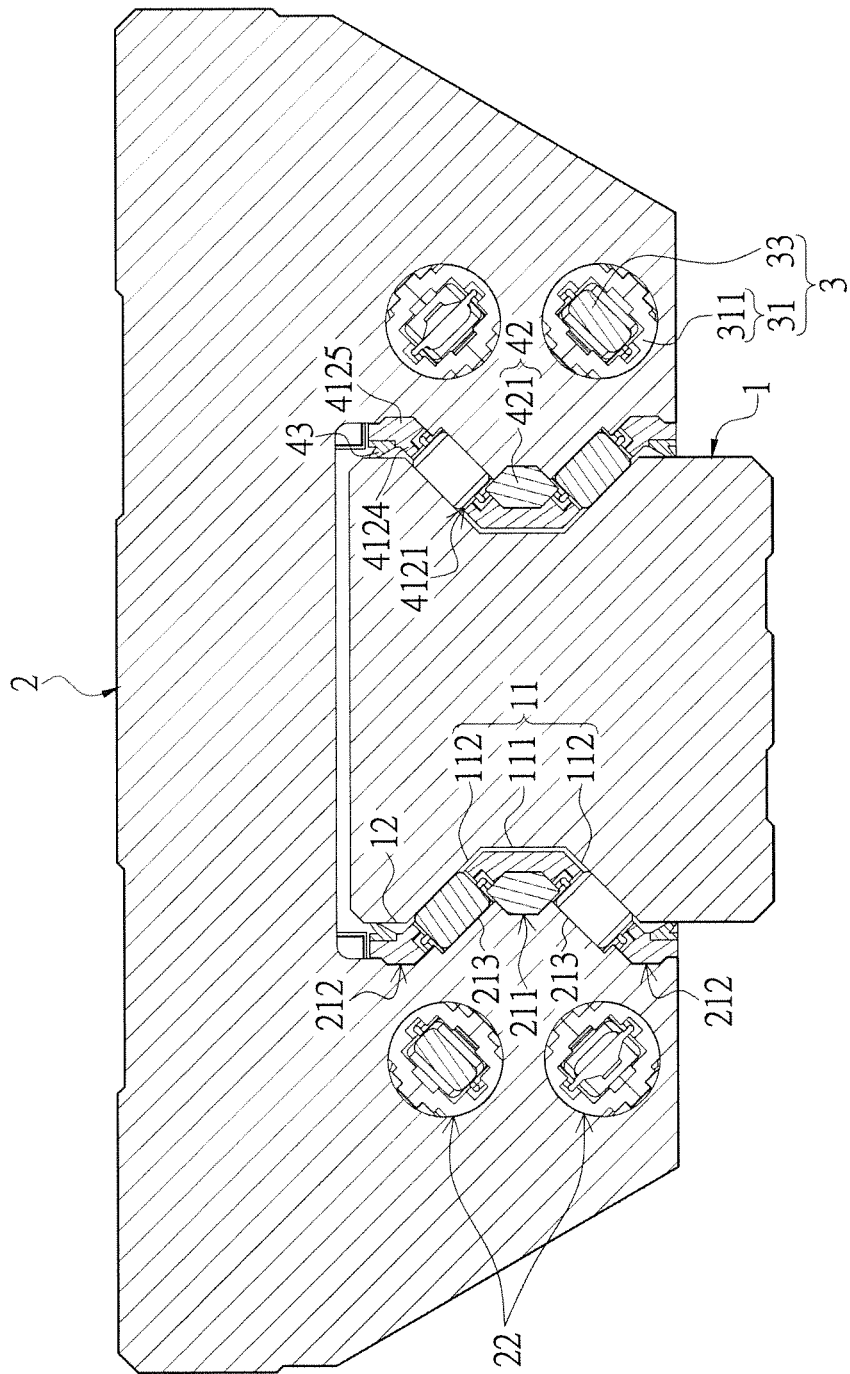
FIG. 1A is a cross-sectional view of FIG. 1 taken along line 1A-1A.
Figure 4:
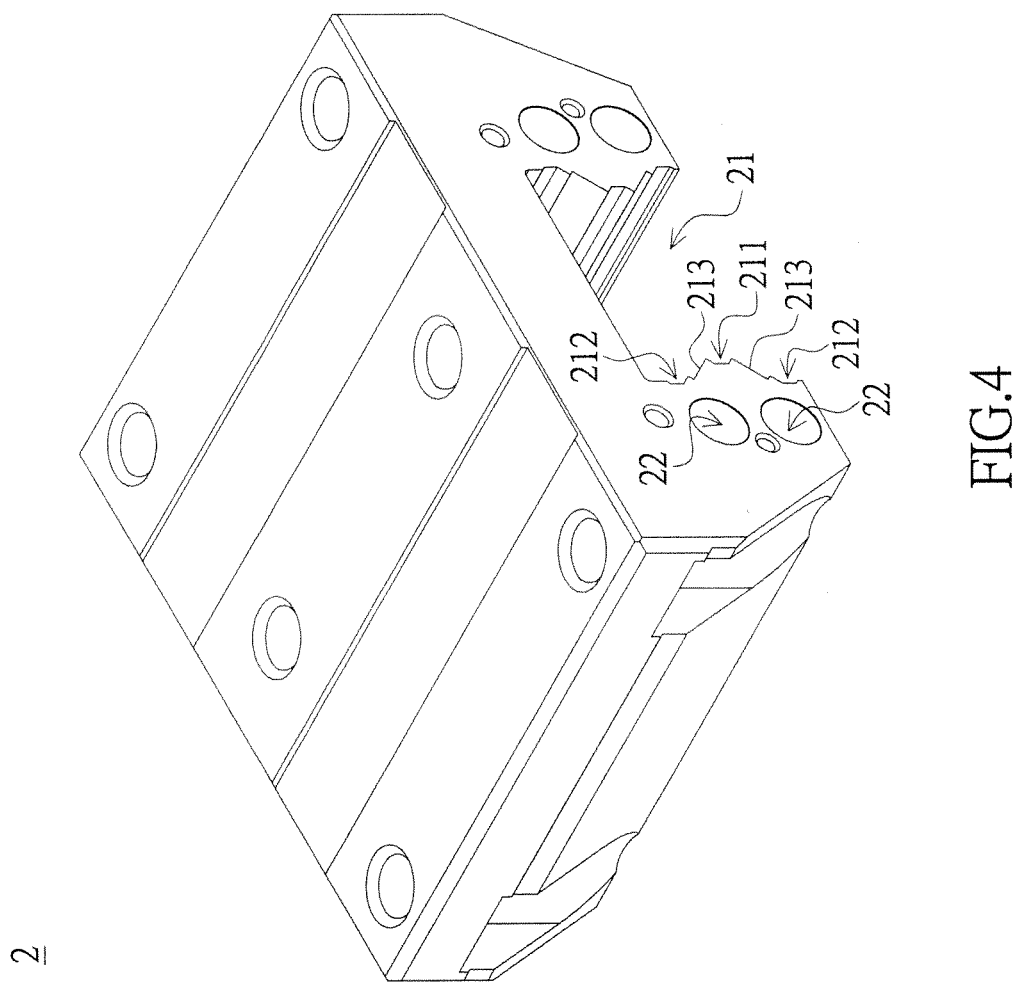
FIG. 4 is a perspective view illustrating the sliding block according to the instant disclosure.

Please refer to FIGS. 3 and 4. The sliding block 2 is an elongated structure, and the length of the sliding block 2 is smaller than the length of the guide rail 1. A mating trough 21 is concavely formed on the sliding block 2, that is to say, the cross-section of the sliding block 2, which is perpendicular to the elongation direction of the sliding block 2, is approximately U-shaped. The mating trough 21 of the sliding block 2 is slidably sleeved at the guide rail 1. The elongation direction of the sliding block 2 is parallel to the elongation direction of the guide rail 1 (such as the sliding direction S). Two opposite inner side surfaces of the mating trough 21 are respectively spaced apart from the opposite side surfaces of the guide rail 1 (as shown in FIG. 1A) for enabling the circulation module 3 and the retainers 4 to arrange between the opposite inner side surfaces of the mating trough 21 and the opposite side surfaces of the guide rail 1.

The sliding block 2 includes two opposite side portions substantially symmetrical to the guide rail 1, such that the following description just discloses one side portion of the sliding block 2. Specifically, the inner side surface of each side portion of the mating trough 21 is formed with a positioning groove 211, two side positioning grooves 212, and two carrying walls 213.

One carrying wall 213 is arranged between the positioning groove 211 and one side positioning groove 212, and another carrying wall 213 is arranged between the positioning groove 211 and another side positioning groove 212. In the cross-section of the sliding block 2 perpendicular to the sliding direction S (as shown in FIG. 1A), the perpendicular bisectors of the carrying walls 213 are perpendicularly intersected at a position, which is at one side of the positioning groove 211 away from the guide rail 1. In other words, the positioning groove 211 and the carrying walls 213 are corresponding to the rolled groove 11. Specifically, the positioning groove 211 faces the bottom wall 111 of the rolled groove 11, and the carrying walls 213 respectively face the loaded side walls 112 of the rolled groove 11.

Moreover, a portion of the sliding block 2 apart from each carrying wall 213 in a predetermined distance is formed with a penetrating accommodating channel 22 along the sliding direction S. The carry walls 213 together with the faced loaded side walls 112 are respectively corresponding to the accommodating channels 22. Specifically, in the cross-section of the sliding block 2 perpendicular to the sliding direction S, the perpendicular bisector of each carrying wall 213 passes through the center of the corresponding accommodating channel 22.

As shown in FIG. 3, the circulation modules 3 are respectively installed on two opposite inner side surfaces of the sliding block 2 (i.e., the inner left side surface and the inner right side surface of the sliding block 2 as shown in FIG. 3). The following description just discloses one circulation module 3 and the corresponding components, because the circulation modules 3 have the same structure.

Figure 5:
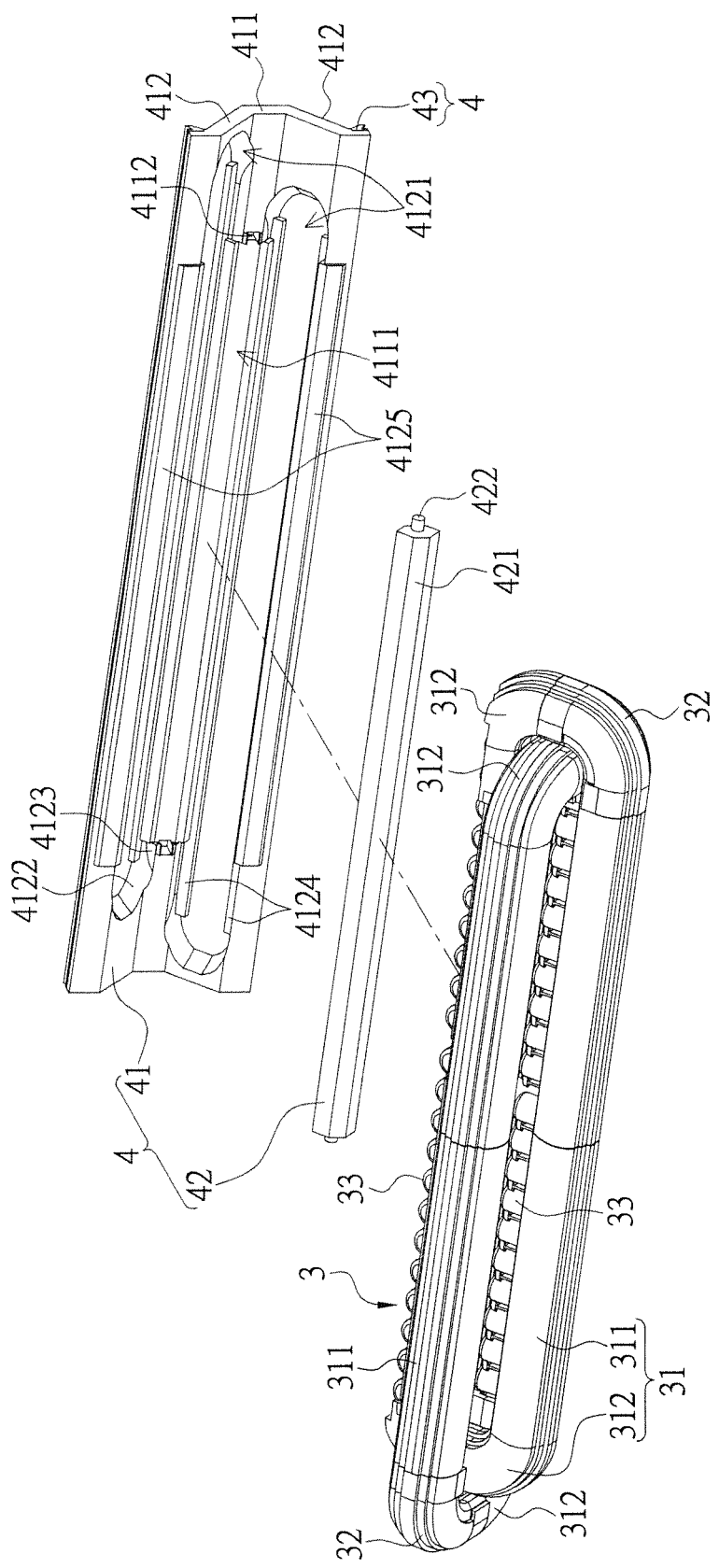
FIG. 5 is a perspective view illustrating one circulation module and the corresponding retainer according to the instant disclosure.
Figure 6:
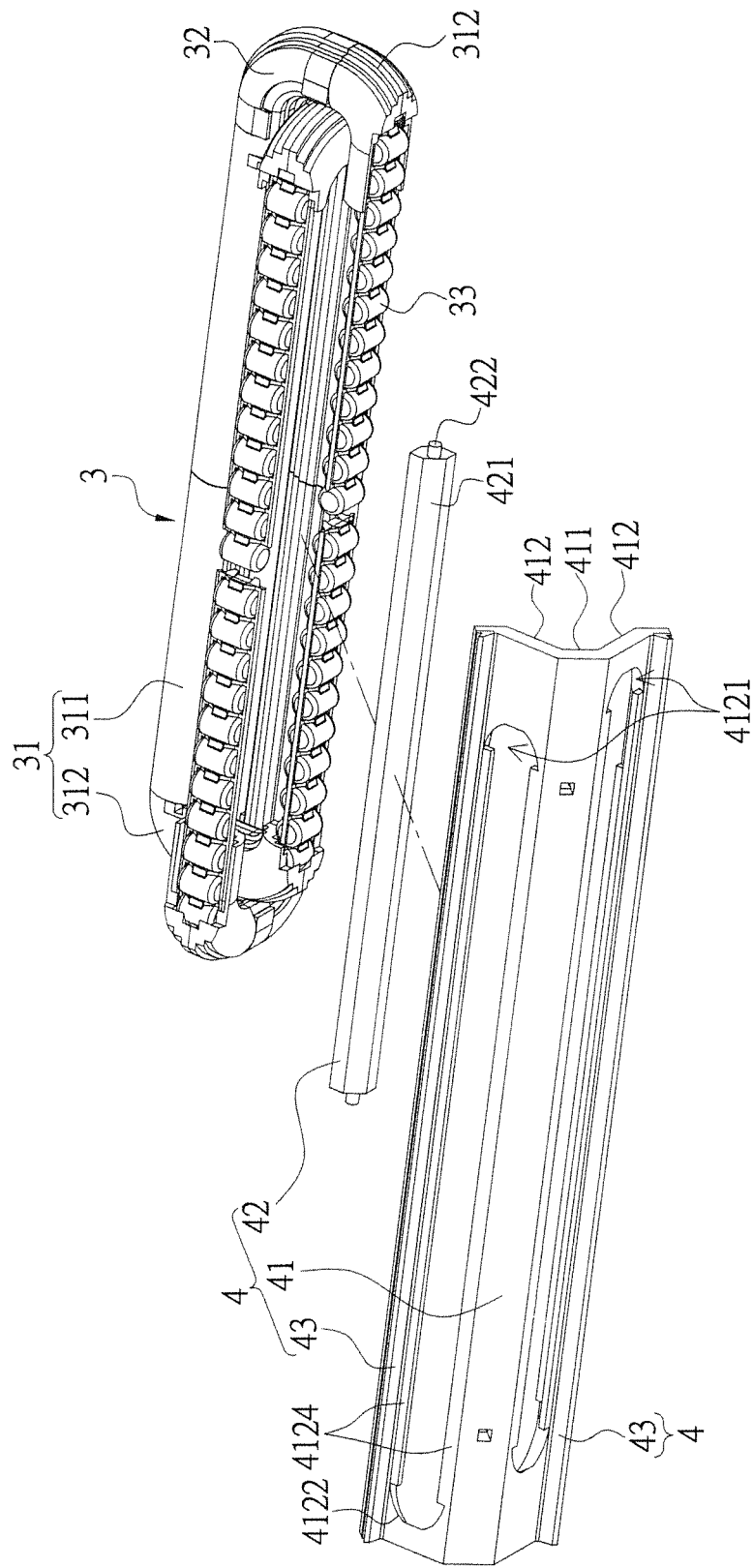
FIG. 6 is a perspective view of FIG. 5 from another viewing angle.

Please refer to FIGS. 5 and 6. The circulation module 3 includes two circulation tubes 31, two separating sheets 32, and two rolling units 33. Each circulation tube 31 in the instant embodiment is formed by assembling several half tubes, but the following description takes each circulation tube 31 to be one piece for conveniently explaining the construction. Each rolling unit 33 in the instant embodiment takes the rolling pillars connected by the chain for example, but the rolling unit 33 is not limited thereto.

Figure 7:
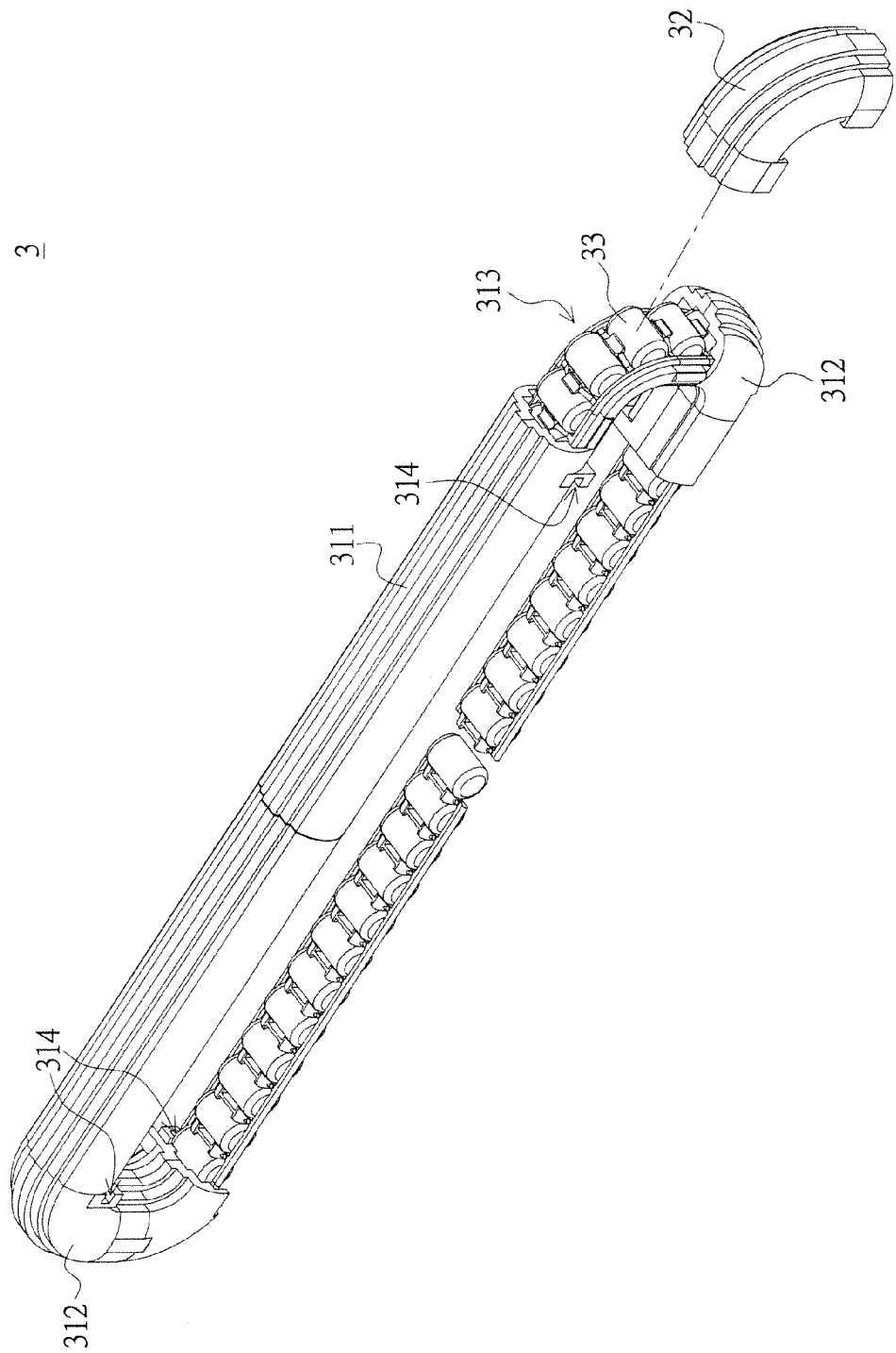
FIG. 7 is an exploded view illustrating the circulation tube and the corresponding separating sheet according to the instant disclosure.

As shown in FIG. 7, each circulation tube 31 includes a straight portion 311 and two U-like cornering portions 312 respectively extended from two opposite ends of the straight portion 311. The length of the straight portion 311 of each circulation tube 31 is greater than the length of accommodating channel 22. The ends of two cornering portions 312 of each circulation tube 31 are facing to each other, and the distance of the ends of two cornering portions 312 of each circulation tube 31 is smaller than the length of accommodating channel 22. One of the cornering portions 312 of each circulation tube 31 includes a fill-in opening 313 formed on a portion thereof adjacent to the straight portion 311. The separating sheet 32 is arced and installed on the circulation tube 31 to shield the fill-in opening 313, such that the circulation tube 31 and the corresponding separating sheet 32 are jointly defines a rolling path, in which the rolling path communicates with the outer space via the ends of cornering portions 312 of the corresponding circulation tube 31.

Figure 8:
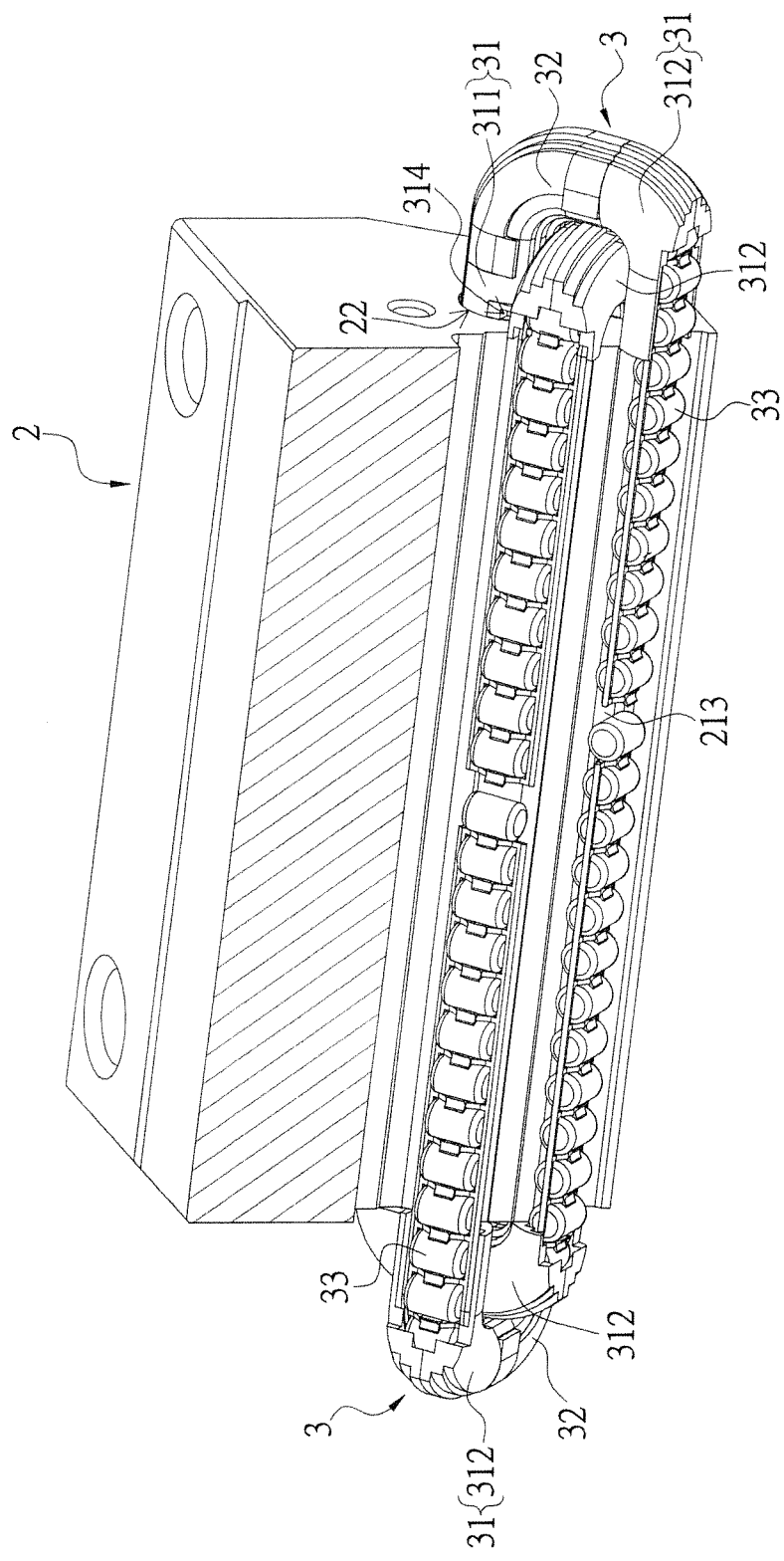
FIG. 8 is a cross-sectional view illustrating one circulation module installed on the sliding block according to the instant disclosure.

As shown in FIG. 8, the straight portion 311 of each circulation tube 31 is configured to couple through the corresponding accommodating channel 22, and the straight portion 311 is firmly arranged in the corresponding accommodating channel 22 by a step-like structure formed on the outer surface of the straight portion 311. The ends of the cornering portions 312 of each circulation tube 31 are disposed on the corresponding carrying wall 213. A portion of the straight portion 311 of each circulation tube 31 adjacent to the fill-in opening 313 is protruding out of the sliding block 3, and the cornering portion 312 having the fill-in opening 313 is arranged outside the adjacent cornering portion 312 without the fill-in opening 313.

In other words, when viewing the cornering portions 312 of the circulation module 3 from one end portion of the sliding block 2, the cornering portion 312 having the fill-in opening 313 of each circulating tube 31 (i.e., the position of separating sheet 32) is arranged outside the cornering portion 312 without the fill-in opening 313 of another circulating tube 31. The circulation tubes 31 of each circulation module 3 are installed on the sliding block 2 in a staggered and crossed arrangement.

The rolling unit 33 is rollably arranged in the corresponding circulation tube 31 via the fill-in opening 313, in which the rolling unit 33 is rolling out of the circulation tube 31 from the end of one cornering portion 312 along the carrying wall 213, and then rolling into the circulation tube 31 via the end of another cornering portion 312 for establishing an entire circulation loop. The separating sheet 32 is installed on the circulation tube 31 after the installation of the rolling unit 33, so that the rolling unit 33 is shield by the circulation tube 31 and the separating sheet 32, thereby preventing the rolling unit 33 from exposing out of the sliding block 2. Specifically, the rolling unit 33 is rollable on a track structure, which is formed on the inner surfaces of the circulation tube 31 and the separating sheet 32, and the corresponding carrying wall 213.

Additionally, a portion of each circulation tube 31 protruding out of the sliding block 2 has an oil-guiding opening 314. Each oil-guiding opening 314 is communicated with the inner space of the corresponding circulation tube 31, and the oil-guiding openings 314 of each circulation module 3 are arranged adjacent to each other, such that each oil-guiding opening 314 is configured to provide a lubricating oil to be injected into the circulation tube 31.

As shown in FIGS. 1 and 2, the retainers 4 are respectively clipped between the opposite inner side surfaces of the mating trough 21 and the opposite side surfaces of the guide rail 1. The retainers 4 are configured to position and keep the positions of the circulation modules 3 with respect to the guide rail 1. The following description discloses one retainer 4 and the corresponding components, because the retainers 4 have the same structure and symmetrical to the guide rail 1.

Please refer to FIGS. 5 and 6. The retainer 4 is elongated, and the length of the retainer 4 is greater than the length of the sliding block 2. The retainer 4 includes a retaining member 41, a supporting member 42, and two dustproof strips 43. The retaining member 41 is integrally formed, and the cross-section of the retaining member 41, which is perpendicular to the elongated direction of the retaining member 41, is approximately V-shaped.

Specifically, the retainer 4 has an elongated base portion 411 and two side wing portions 412 respectively and slantingly extended from two opposite long edges of the base portion 411 along two different directions (i.e., the upper left direction and the lower left direction of the base portion 411 as shown in FIG. 5). The base portion 411 has a receiving groove 4111 formed on the center portion thereof along the elongation direction thereof. The base portion 411 further has two pair of clipping bumps 4112 respectively formed adjacent to two opposite ends of the receiving groove 4111 (i.e., the left end and the right end of the receiving groove 4111 as shown in FIG. 5).

Moreover, each side wing portion 412 has an elongated positioning opening 4121 formed along the elongation direction thereof. One positioning opening 4121 is offset with respect to the receiving groove 4111 along a first direction (i.e., the upper positioning opening 4121 is formed toward the right side of the receiving groove 4111 as shown in FIG. 5), and another positioning opening 4121 is offset with respect to the receiving groove 4111 along a second direction opposite to the first direction (i.e., the lower positioning opening 4121 is formed toward the left side of the receiving groove 4111 as shown in FIG. 5).

Specifically, each positioning opening 4121 is surroundingly defined by two elongated walls 4123 and two arced walls 4122 of the side wing portion 412. Two positioning flanges 4124 are respectively extended from the two elongated walls 4123 of each side wing portion 412. The positioning flanges 4124 of each side wing portion 412 are arranged in the corresponding positioning opening 4121 and facing to each other. The distance between the positioning flanges 4124 of each side wing portion 412 is smaller than the biggest distance of arced walls 4122. Moreover, a mating flange 4125 is formed on a portion of each side wing portion 412 away from the base portion 411, and the mating flange 4125 conforms to the side positioning groove 212.

The supporting member 42 has a mating post 421 and two clipped pillars 422. The cross-section of the mating post 421, which is perpendicular to the elongation direction of the mating post 421, is hexagon, and two opposite portions of the mating post 421 (i.e., the front portion and the rear portion of the mating post 421 as shown in FIG. 5) respectively conform to the positioning groove 211 and the receiving groove 4111. The clipped pillars 422 are respectively and integrally extended from two end surfaces of the mating post 421 (the left end surface and the right end surface of the mating post 421 as shown in FIG. 5).

Moreover, one side portion of the mating post 421 is wedged to the receiving groove 4111 of the retaining member 41, and the clipped pillars 422 are respectively clipped by the pairs of clipping bumps 4112. The dustproof strips 43 are respectively disposed (e.g., adhered) on the side wing portions 412 away from the base portion 411 and approximately located at the back of the mating flange 4125. That is to say, the dustproof strips 43 are respectively disposed (e.g., adhered) on two outside end portions of the retaining member 41.

Figure 9:
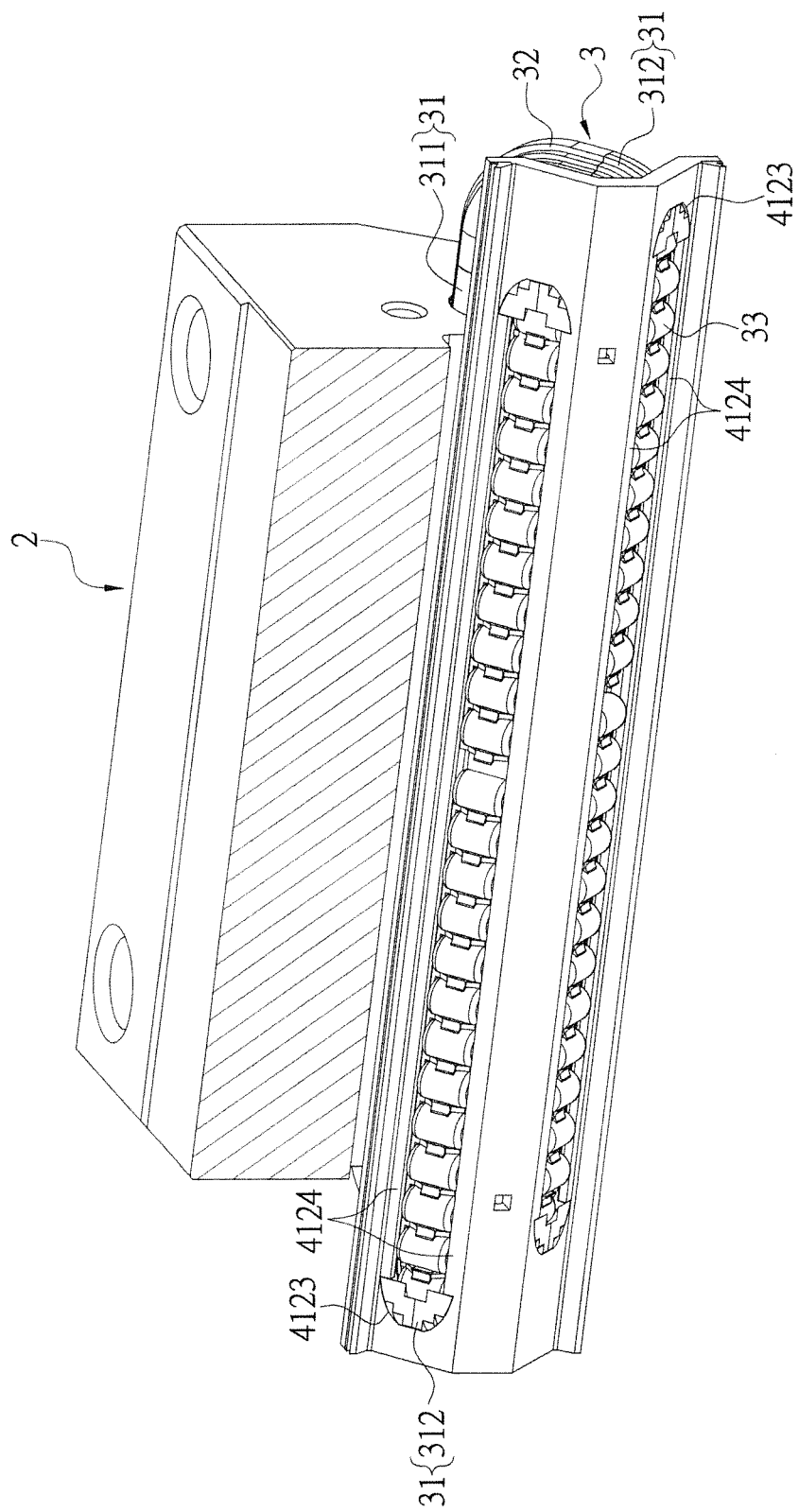
FIG. 9 is a cross-sectional view illustrating one circulation module together with the corresponding retainer installed on the sliding block according to the instant disclosure.

Please refer to FIGS. 1A and 9, and with reference occasionally made to FIGS. 5 and 6. The relationship between the retainer 4 and the corresponding components is disclosed as follows. The cooperation of the retainer 4 and the sliding block 2: the mating post 421 is wedged to the positioning groove 211, and the mating flanges 4125 of the side wing portions 412 are respectively wedged to the side positioning grooves 212. The cooperation of the retainer 4 and the circulation module 3: the circulation tubes 31 are respectively coupled through the positioning openings 4121 of the retaining member 41, in more detail, the ends of cornering portions 312 of each circulation tube 31 are respectively wedged to the arced walls 4122 and the adjacent end surfaces of the positioning flanges 4121, and part of the rolling unit 33 disposed on each carrying wall 213 is arranged in the corresponding positioning opening 4121. The cooperation of the retainer 4 and the guide rail 1: the outer surfaces of the retainer 4 (corresponding to the outside edge of the V-shaped) are respectively spaced apart from the rolled groove 11 of the guide rail 1, and the dustproof strips 43 are respectively abutted against the two contact surfaces 12, which are arranged adjacent to the rolled groove 11.

Please refer to FIG. 2. The two end cap modules 5 are respectively fixed on the end surfaces 23 of the sliding block 2 and slidably sleeved at the guide rail 1. The end cap modules 5 are respectively covering the portions of the circulation modules 3 protruding out of the sliding block 2 (i.e. the cornering portions 312 and the separating sheets 32). Part of each rolling unit 33 arranged out of the sliding block 2 is spaced apart from the adjacent end cap module 5 by the corresponding circulation tube 31 and the corresponding separating sheet 32. That is to say, the rolling unit 33 does not contact the end cap module 5.

The following description discloses one end cap module 5 and the corresponding components, because the end cap modules 5 have the same structure and symmetrical to the sliding block 2.

Figure 10:
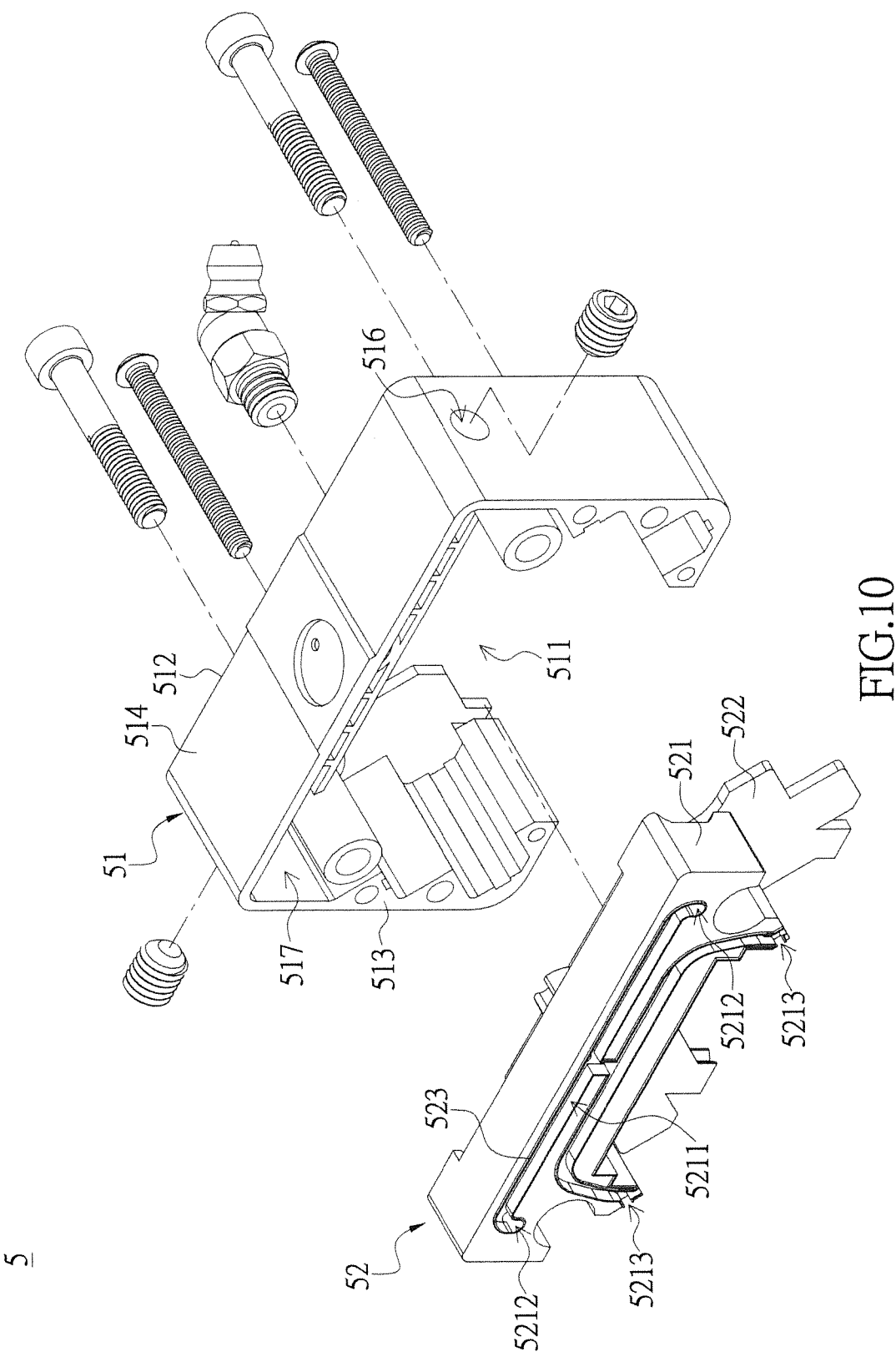
FIG. 10 is an exploded view of the end cap module according to the instant disclosure.
Figure 11:
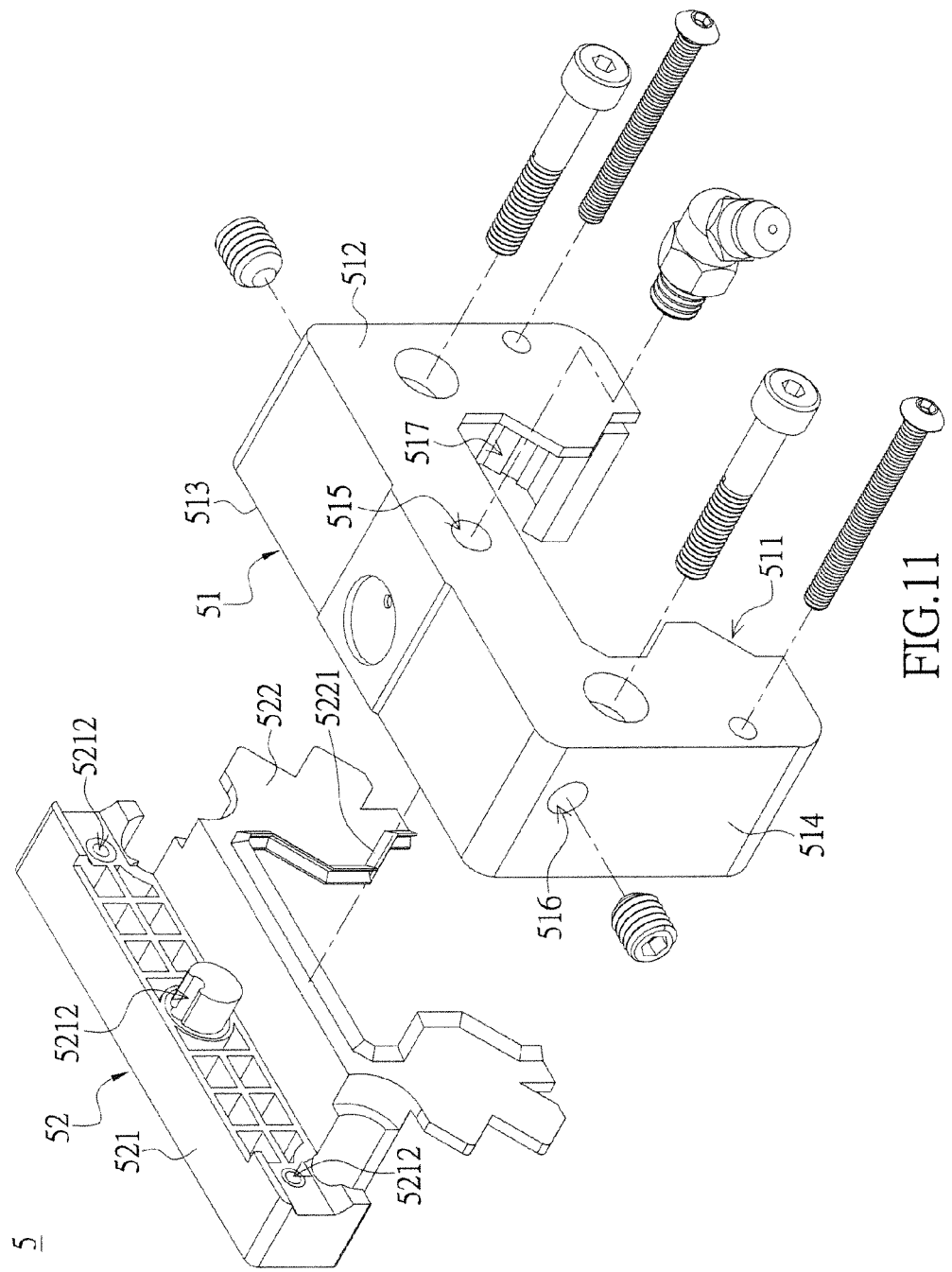
FIG. 11 is an exploded view of FIG. 10 from another viewing angle.

Please refer to FIGS. 10 and 11. The end cap module 5 includes a cap 51 and a dustproof member 52. The cap 51 is non-flexible and integrally formed by a hard material (e.g., metal), and the dustproof member 52 is flexible and integrally formed by a resilient material (e.g., rubber). Moreover, the cap 51 and the dustproof member 52 are two detachable components.

The cap 51 is a reversed U-like construction for mating to the guide rail 1, that is to say, the cap 51 has a rail opening 511 formed corresponding to the guide rail 1. The cap 51 has an outer surface 512, an inner surface 513, and a side surface 514. The outer surface 512 and the inner surface 513 are two opposite surfaces of the cap 51, and the side surface 514 connects the edge of outer surface 512 and the edge of inner surface 513. Moreover, the cap 51 has an oil-input hole 515 penetratingly formed from the outer surface 512, and the cap 51 has two side oil-input holes 516 penetratingly formed from the side surface 514. The cap 51 has an accommodating slot 517 concavely formed on the inner surface 513.

The dustproof member 52 has an oil-guiding block 521 and a dustproof sheet 522 integrally extended from the rear portion of the oil-guiding block 521. The oil-guiding block 521 has an oil-guiding passage 5211 by concavely formed on the front portion thereof. The dustproof sheet 522 has a dustproof brush 5221, and the dustproof brush 5221 is conforming to the guide rail 1 for abutting against the guide rail 1. Specifically, the oil-guiding passage 5211 defines three inlets 5212 and two outlets 5213. The oil-guiding passage 5211 is concavely formed on a surface of the oil-guiding block 521 away from the dustproof sheet 522. The oil-guiding block 521 has a protrusion 523 substantially around the oil-guiding passage 5211.

Figure 12:
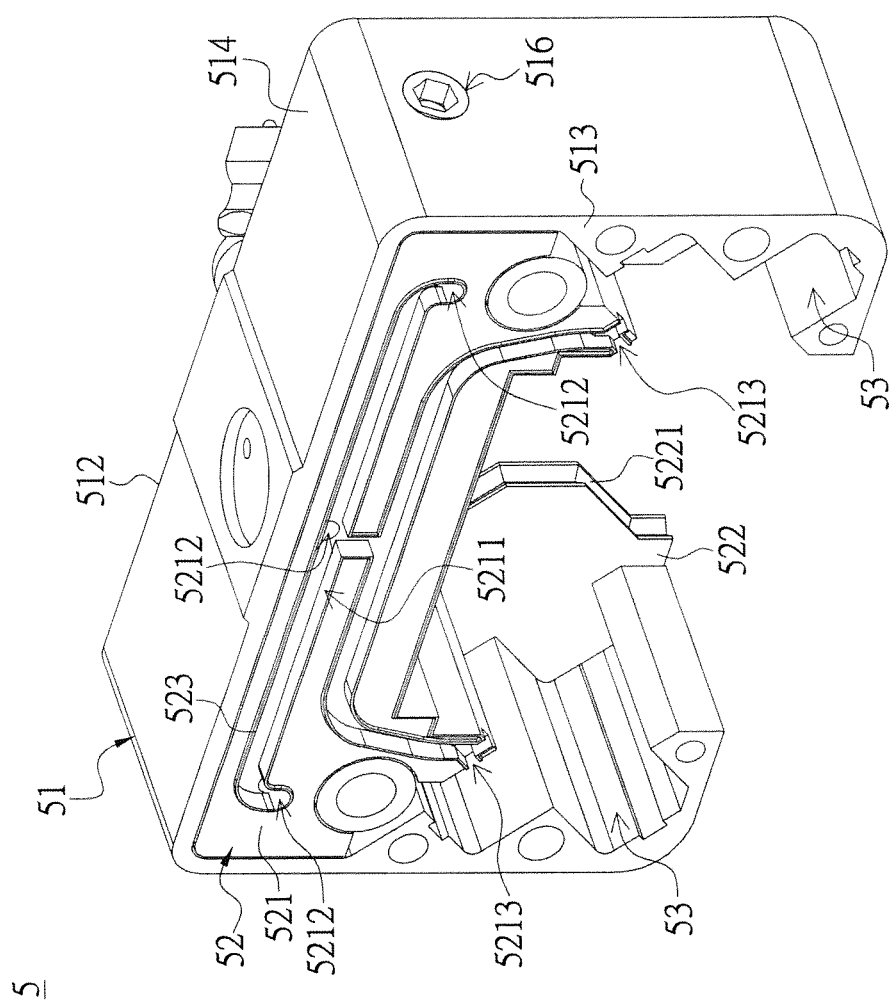
FIG. 12 is a perspective view illustrating the end cap module according the instant disclosure.

Please refer to FIG. 12, and with reference occasionally made to FIGS. 10 and 11. The dustproof member 52 is installed (wedged) in the accommodating slot 517 of the cap 51. The surface of the oil-guiding block 521 away from the dustproof sheet 522 is coplanar with the inner surface 513 of the cap 51, and the protrusion 523 is protruding out of the inner surface 513. The inlets 5212 of the oil-guiding passage 5211 are respectively communicated with the oil-input hole 515 and the side oil-input holes 516. Additionally, an oil nozzle (not numbered) can be installed at the oil-input hole 515, and two socket set screws (not numbered) can be respectively installed at the side oil-input holes 516.

Moreover, the dustproof brush 5221 is arranged on the rail opening 511. The dustproof sheet 522 and the cap 51 jointly defines an accommodating space 53, that is to say, when the dustproof member 52 received in the accommodating slot 517, the remnant space of the accommodating slot 517 is regarded as the accommodating space 53.

Figure 1B:
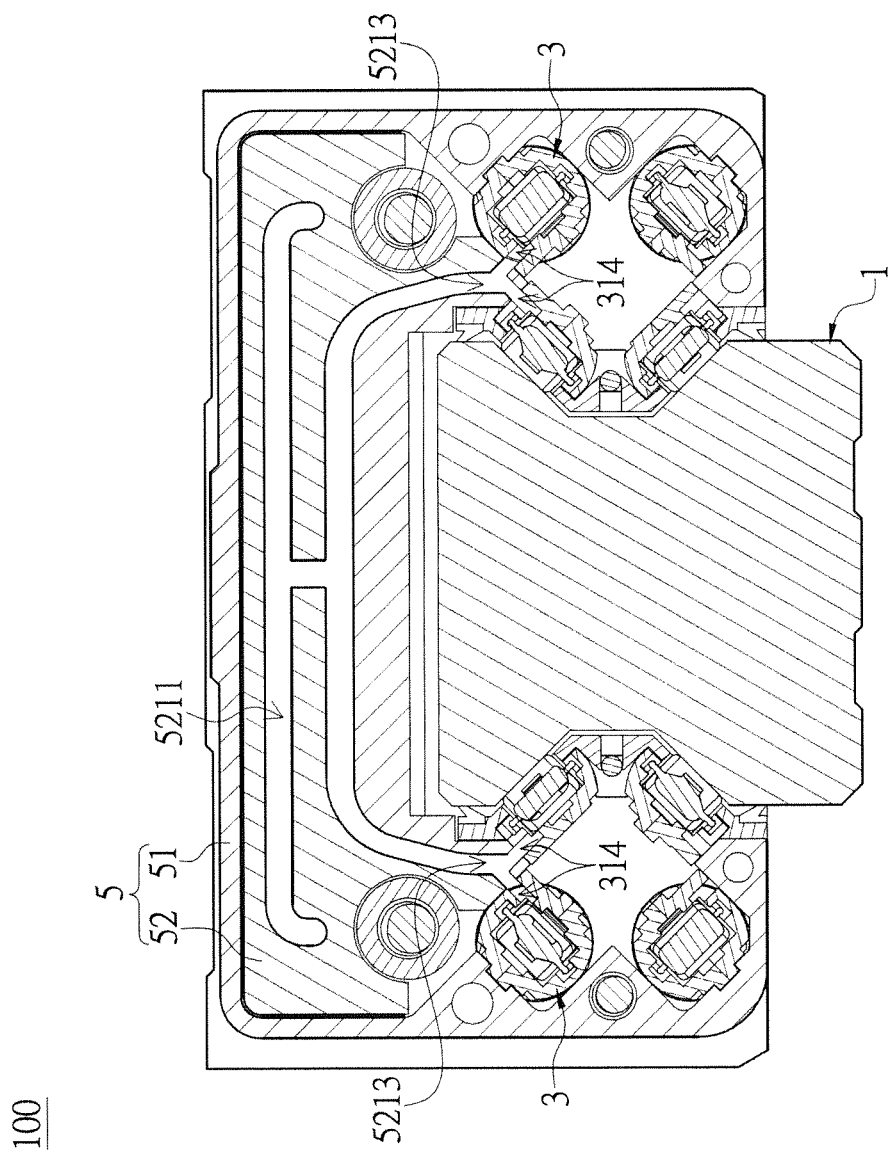
FIG. 1B is a cross-sectional view of FIG. 1 taken along line 1B-1B.

Please refer to FIGS. 1B, 2, and 12. The end cap module 5 is fixed on the end surface 23 of the sliding block 2, a portion of each circulation tube 31 exposed from the sliding block 2 (i.e., the cornering portions 312) and the separating sheet 32 are arranged in the accommodating space 53, and the separating sheet 32 and the cornering portion 312 having the fill-in opening 313 are approximately contact the dustproof sheet 522. Moreover, the end of each retaining member 41 protruding out of the sliding block 2 is abutted against the dustproof sheet 522. The protrusion 523 of the oil-guiding block 521 is seamlessly abutted against the end surface 23 of the sliding block 2, and the outlets 5213 of the oil-guiding passage 521 respectively align the corresponding oil-guiding openings 314 of the circulation modules 3. In other words, the oil-guiding passage 5211 is arranged between the oil-input hole 515 and the side oil-input holes 516 of the cap 51 and the adjacent oil-guiding openings 314 to enable the oil-input hole 515 and the side oil-input holes 516 of the cap 51 to communicate with the adjacent oil-guiding openings 314 via the oil-guiding passage 5211.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A linear guideway, comprising:
    a guide rail having two opposite rolled grooves;
    a sliding block having a mating trough slidably sleeved at the guide rail, the sliding block having four accommodating channels respectively penetrating two opposite portions thereof and respectively arranged at two opposite sides of the mating trough;
    two circulation modules respectively fixed on the opposite portions of the sliding block, each circulation module comprising:
        two circulation tubes respectively coupling through two adjacent accommodating channels, each circulation tube partially protruding out of the sliding block; and
        two rolling units respectively arranged into the circulation tubes, wherein part of each rolling unit is arranged out of the corresponding circulation tube and clipped between the guide rail and the sliding block; and
    two retainers respectively arranged in the rolled grooves of the guide rail and installed on the sliding block, wherein the retainers are configured to position and keep the positions of the circulation modules with respect to the guide rail, each retainer comprising:
        a retaining member having a base portion and two side wing portions integrally extended from the base portion, each side wing portion has a positioning opening, wherein the circulation tubes of the corresponding circulation module are positioned at the retaining member by the circulation tubes respectively coupling through the positioning openings of the side wing portions, and part of each rolling unit arranged out of the corresponding circulation tube is arranged in the corresponding positioning opening; and
        a supporting member having two opposite side portions respectively wedged to the base portion of the retaining member and the sliding block; and
    two end cap modules fixed on the sliding block and slidably sleeved at the guide rail, and the end cap modules respectively covering the portions of the circulation modules protruding out of the sliding block.

2. The linear guideway according to claim 1, wherein the mating trough has two positioning grooves respectively formed on two opposite inner side surfaces thereof, the base portion of each retaining member has a receiving groove, each supporting member has a mating post, and the opposite side portions of each mating post are respectively wedged to the positioning groove of the corresponding mating trough and the receiving groove of the corresponding retaining member.

3. The linear guideway according to claim 2, wherein the circulation tubes of each circulation module are installed at the sliding block in a staggered arrangement, wherein in each retaining member, one positioning opening is offset along a first direction, another positioning opening is offset along a second direction opposite to the first direction, thereby respectively positioning the staggered circulation tubes of the corresponding circulation module.

4. The linear guideway according to claim 3, wherein each rolled groove has two loaded side walls, each inner side surface of the mating trough is formed with two carrying walls respectively facing the loaded side walls of the corresponding rolled groove, the carry walls together with the faced loaded side walls are respectively corresponding to the accommodating channels, wherein part of each rolling unit arranged out of the corresponding circulation tube is clipped between one of the loaded side walls of the guide rail and the corresponding carrying wall of the sliding block, and wherein each carrying wall defines a perpendicular bisector, the perpendicular bisectors of two adjacent carrying walls are perpendicular to each other and respectively passing through the centers of the corresponding accommodating channels.

5. The linear guideway according to claim 2, wherein the base portion of each retaining member has two pair of clipping bumps respectively formed adjacent to two opposite ends of the receiving groove, each supporting member has two clipped pillars integrally extended from two opposite end surfaces of the mating post, the clipped pillars of each supporting member are respectively clipped by the clipping bumps of the base portion of the corresponding retaining member.

6. The linear guideway according to claim 1, wherein the cross-section of each retaining member is approximately V-shape, each retainer further comprises two dustproof strips respectively disposed on two outside end portions of the retaining member, and the dustproof strips of each retainer are respectively abutted against two surfaces of the guide rail respectively arranged outside two opposite sides of the corresponding rolled groove.

\* \* \* \* \*